E. WILLIAMS.
Combined Churn and Butter Worker.
No. 223,786. Patented Jan. 20, 1880.
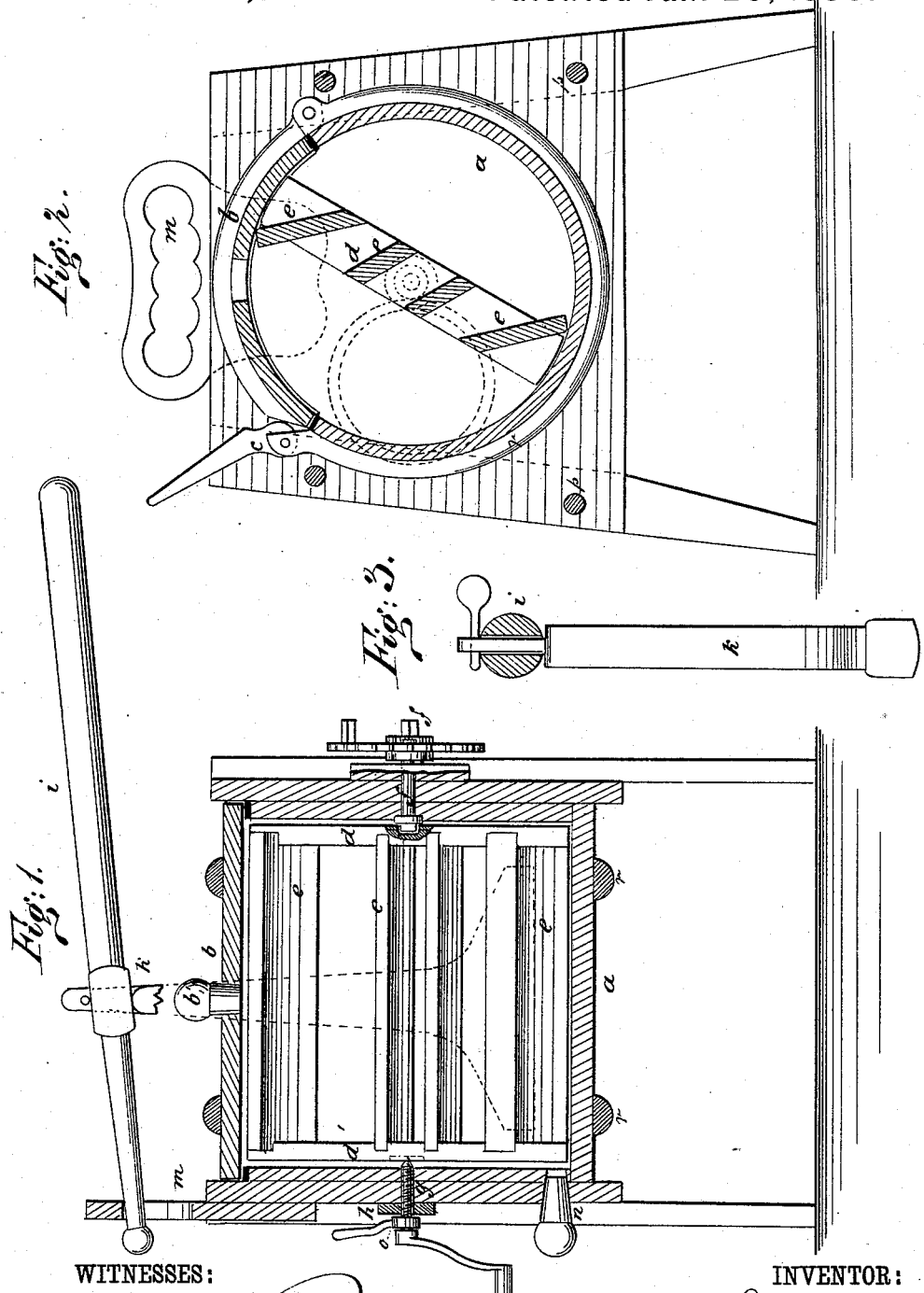

UNITED STATES PATENT OFFICE.

EDWIN WILLIAMS, OF STEAMBURG, NEW YORK.

COMBINED CHURN AND BUTTER-WORKER.

SPECIFICATION forming part of Letters Patent No. 223,786, dated January 20, 1880.

Application filed April 15, 1879.

*To all whom it may concern:*

Be it known that I, EDWIN WILLIAMS, of Steamburg, in the county of Cattaraugus and State of New York, have invented a new and Improved Churn and Butter-Worker, of which the following is a specification.

My improvements relate to churns fitted with dashers revolving on a horizontal axis; and the invention consists in certain novel features of construction whereby churning may be done with greater facility than heretofore, and the churn also adapted for use as a butter-worker.

The invention will be more particularly described in connection with the accompanying drawings, wherein Figure 1 is a vertical longitudinal section of the churn. Fig. 2 is a vertical cross-section. Fig. 3 is a sectional elevation of the butter-working device.

Similar letters of reference indicate corresponding parts.

The cylindrical body $a$ of the churn is provided at its upper side with a hinged cover, $b$, that closes against elastic packing-strips applied to the edges of the cover-opening.

Attached in lugs at the side of the churn are cam-levers $c$, which, when the cover is closed, are to be used for compressing the cover tightly to place and retaining it to prevent escape of milk or cream. The cover is fitted with a knob, $b'$, which may have an opening through it for admission of air.

The dasher consists of side bars, $d\ d'$, and inclined floats $e$, attached rigidly to said bars. In one head of the churn is an arbor, $f$, the inner end of which is squared and enters a socket formed in the bar $d$ of the dasher. At the opposite side the dasher is supported by the pointed end of a screw, $g$, that passes through the churn-head and through a nut, $h$, attached upon the head.

The outer end of screw $g$ is provided with a handle for turning it, and carries a set-nut, $o$, for clamping it when adjusted. By the withdrawal of screw $g$ the dasher is freed, and can then be removed for cleaning or for insertion of the butter-worker, as hereinafter described.

The outer inclined floats, $e$, of the dasher have their outer edges extended to come in contact, or nearly so, with the inner side of the churn-body, and when the dasher is revolved these floats act as scrapers to remove the cream and butter from the sides of the churn. This prevents waste of cream and saves the labor of scraping the churn by hand. The arbor $f$ is provided with gearing and a crank-handle for operating the dasher.

This construction furnishes a compact and efficient churn.

To make use of the churn as a butter-worker I provide the hand-lever $i$, on which is attached loosely the hanger $k$, that is formed with a foot-piece having a rounded under side. Upon one end of the churn-body $a$ a perforated plate, $m$, is attached and projects above the churn. The dasher will first be removed from the churn, the hanger $k$ then inserted through the cover-opening, and one end of lever $i$ placed in the aperture of plate $m$, as shown in Fig. 1. Then, by manipulating the other end of lever $i$ the hanger $k$ is operated to work the butter. The buttermilk and water used in working the butter escape by an opening, $n$, on removal of the plug.

For factory use, a pulley for driving the churn will be attached to the arbor $f$. I prefer to strengthen the cylindrical body $a$ by bands $r\ r$ around the same, which may be of wood or metal.

Having thus described my invention, I claim as new and desire to secure by Letters Patent—

The pivoted churn-body $a$, having cover $b$, in combination with a dasher formed of side bars, $d\ d'$, and floats $e$, the arbor $f$, rigidly secured in bar $d$, and the screw $g$, passing through churn-head and nuts $h\ o$, to allow a butter-worker to be substituted for the dasher, as described.

EDWIN WILLIAMS.

Witnesses:
C. L. LYON,
J. MAY.